March 26, 1946.  L. L. DOSTAL  2,397,249
DETASSELING MACHINE
Filed March 4, 1944  3 Sheets-Sheet 1
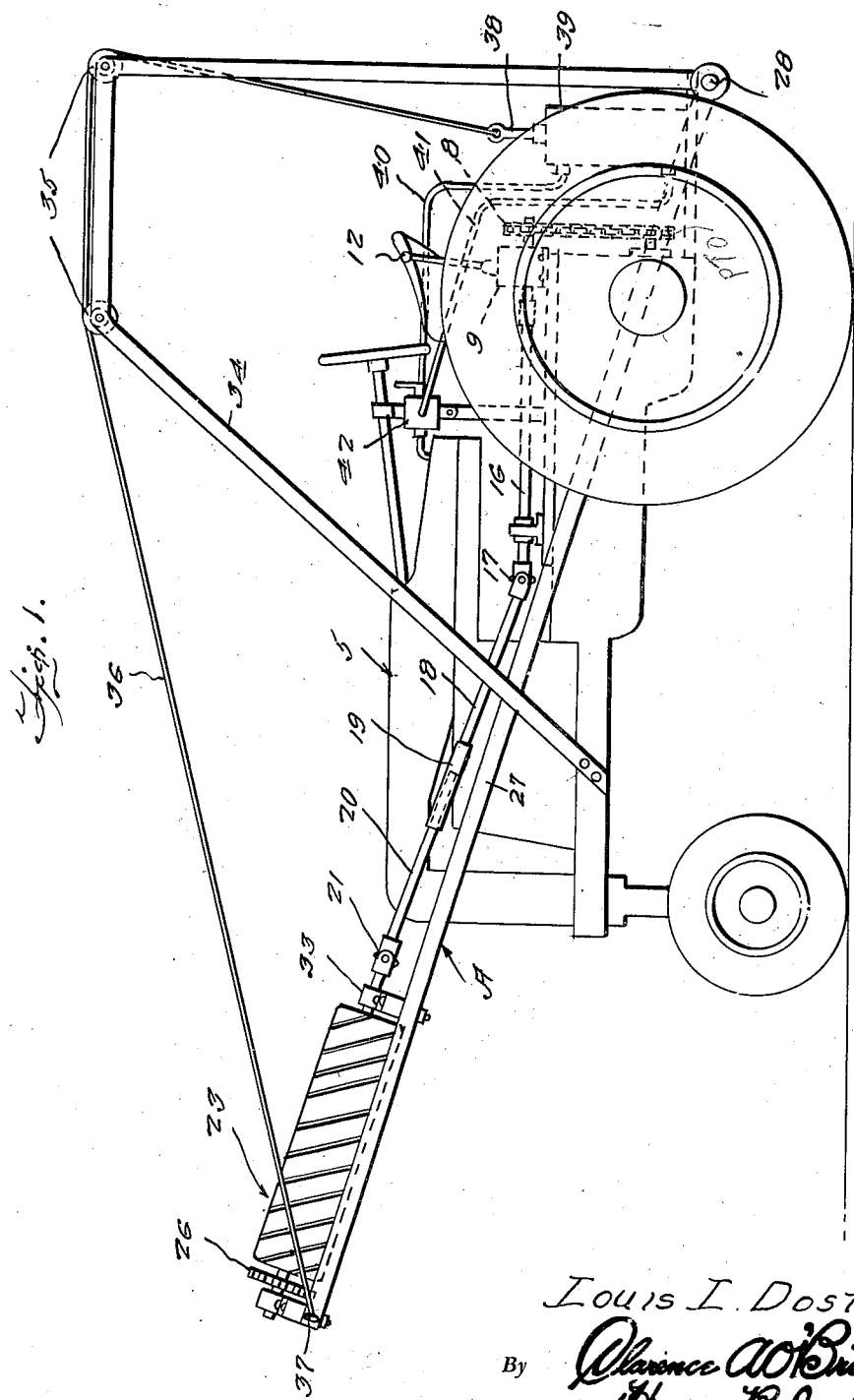
Inventor
Louis L. Dostal
By Clarence A. O'Brien
and Harvey B. Jacobson
Attorneys March 26, 1946.　　L. L. DOSTAL　　2,397,249
DETASSELING MACHINE
Filed March 4, 1944　　3 Sheets-Sheet 2
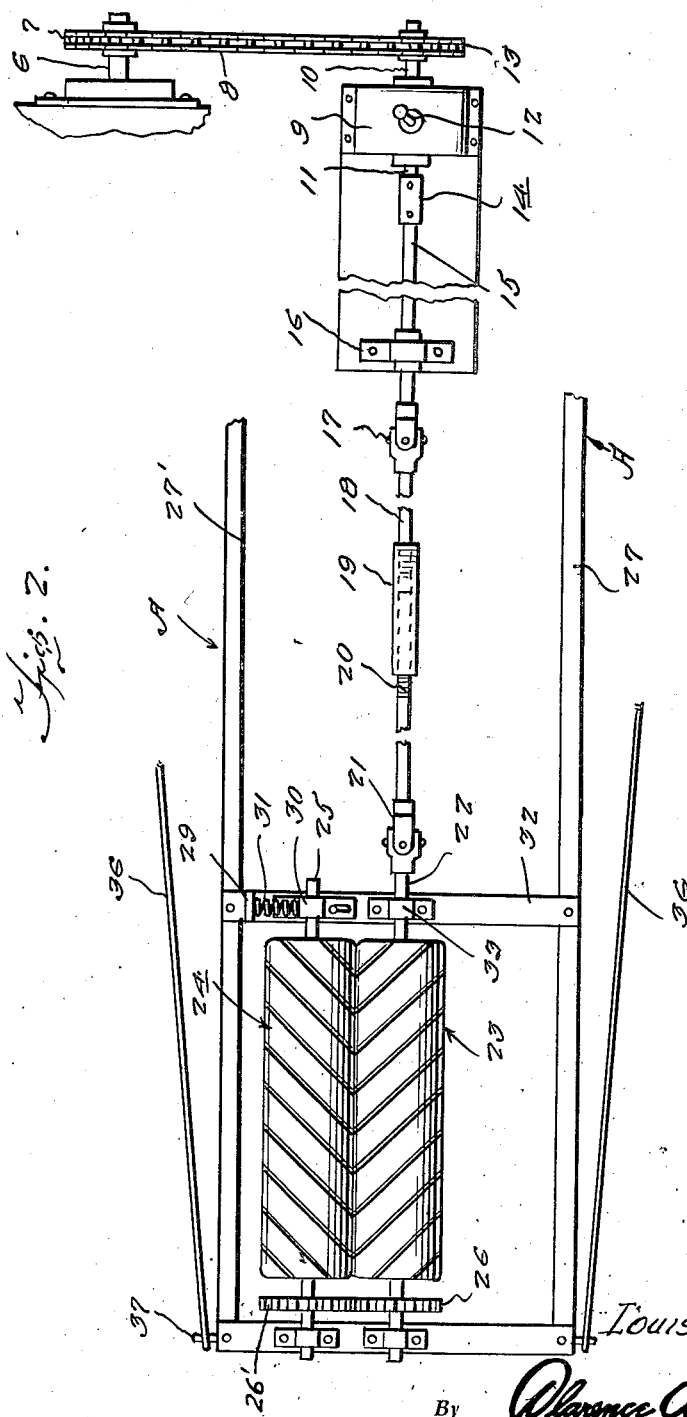
Inventor
Louis L. Dostal
By Clarence A. O'Brien
and Harvey B. Jacobson
Attorneys March 26, 1946.  L. L. DOSTAL  2,397,249
DETASSELING MACHINE
Filed March 4, 1944  3 Sheets—Sheet 3
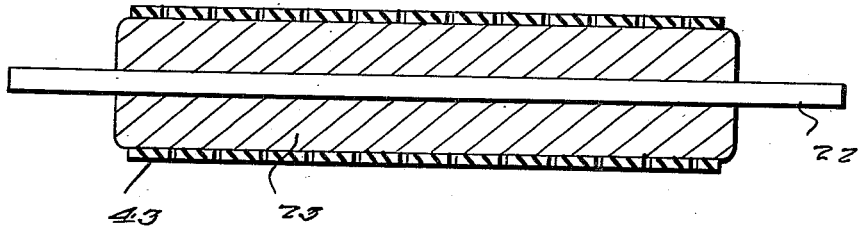
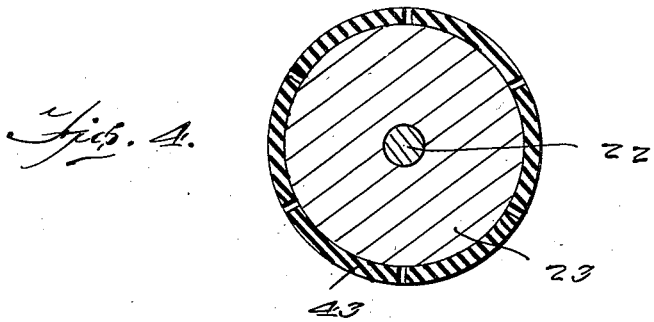
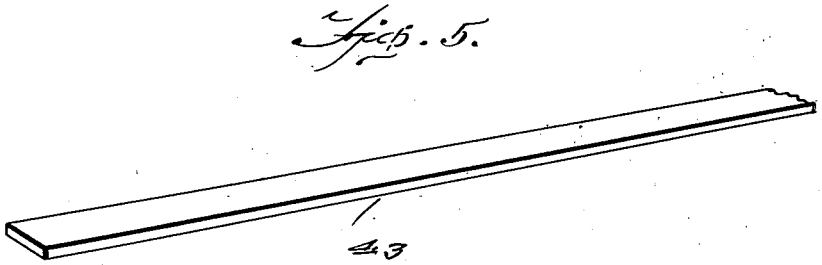
Inventor
Louis L Dostal
By Clarence A. O'Brien
and Harvey B. Jacobson
Attorneys

UNITED STATES PATENT OFFICE 2,397,249

DETASSELING MACHINE

Louis L. Dostal, Jackson, Minn.

Application March 4, 1944, Serial No. 525,115

1 Claim. (Cl. 56—15)

This invention appertains to new and useful improvements in corn treating apparatus and more particularly to a detasseling machine for use in conjunction with hybrid seed corn.

Hybrid seed corn is the result of long research in the art of corn breeding and the development of strong, uniform and high yielding parent strains of corn. It is developed by means of breeding or self-pollinating a certain variety of corn until they have eliminated all of the bad features of that strain. This process is often carried on for five or six generations. This corn is then cross-bred or cross-pollinated with another strain of corn that has been selected as the other parent, and has undergone the same system of elimination. The result of this cross is a new and sturdy variety of corn with all the good characteristics of both parent stocks. In the planting of hybrid corn for seed purposes, both varieties are planted in the same field but in separate rows. Usually it is planted at a 3 to 1 ratio or 2 rows of male corn to pollinate 6 rows of the female corn, which will be harvested for seed purposes. The tassels from these six rows must be removed before they begin to drop their pollen, so as not to be self-pollinated. The two rows are left to pollinate themselves and the other six rows. Seed corn is not harvested from the two rows of male corn. The tassels from the female rows must be pulled out, usually at the first joint, to do the least possible injury to the stalk; if the stalk were cut it would lose its vitality by bleeding out, especially in wet weather where the wound could not dry.

The principal object of the present invention is to provide a machine for pulling tassels from corn stalks in a very satisfactory manner.

Other objects and advantages of the invention will become apparent to the reader of the following description.

In the drawings—

Figure 1 is a side elevational view of the machine.

Figure 2 is a fragmentary top plan view showing the rolls and the drive means therefor.

Figure 3 is a longitudinal sectional view through one of the rolls.

Figure 4 is a transverse sectional view of one of the rolls.

Figure 5 is a fragmentary perspective view of one of the winding strips.

Referring to the drawings wherein like numerals designate like parts, it can be seen that numeral 5 generally refers to a vehicle such as a farm tractor. This type of tractor generally has a power take-off shaft 6 and in the present instance is equipped with a sprocket wheel 7 over which a chain 8 is trained. Numeral 9 generally refers to a geared transmission having a drive shaft 10 and a driven shaft 11 and a suitable hand control 12. The shaft 10 has a sprocket wheel 13 over which the chain 8 is trained. A coupling 14 connects the driven shaft 11 with a shaft section 15 disposed through a bearing 16 and the shaft section 15 is connected by a universal joint 17 to a shaft 18 which has a hollow extension 19 formed with a square passageway for receiving a square shaft section 20, the latter, in turn, being connected by a universal joint 21 to a shaft 22 on which a roll 23 is located. The roll 23 cooperates with a roll 24 for the removal of tassels from corn stalks.

It can be seen that the roll 24 has a shaft 25 and the shafts 22 and 25 are equipped with meshing gears 26, 26' so that the shaft 22 drives the shaft 25 so that both rolls operate in unison. Numeral A generally refers to a boom having side bars 27, 27' which are pivotally secured to the chassis of the tractor 5 as at 28. One of the side bars 27 has an upstanding lug 29 between which and a bearing 30 for the inner end of the shaft 25 a coiled compression spring 31 is interposed, this for the purpose of always maintaining the roll 24 urged against the roll 23. A bridge member 32 bridging the side bars 27 carries a bearing 33 for the shaft 22 and the bearing 30.

A super-frame 34 is supported by the chassis frame of the tractor 5 and has pulleys 35 at the upper portion thereof over which cables 36 are trained, these cables being attached at their forward ends to anchor means 37 on the forward ends of the boom members 27, the cables 36 extend backwardly over the super-frame and downwardly to a piston rod 38 which forms part of a hydraulic unit 39 having fluid pressure lines 40, 41 in conjunction with a control valve 42.

The rolls 23, 24 may be of wood or any desired material, but of cylindrical shape and have wrapped thereon in spiral closely spaced relation, convolutions of rubber stripping 43.

Referring now to the use and operation of the described invention. The tractor 5 is operated to propel the rolls 23, 24 along a row of corn, not shown, over the tassels to straddle the same, the boom A being adjusted vertically through the medium of the hydraulic unit 39 so that the rolls 23, 24 incline upwardly and forwardly over the tassels so as to grip the same as the rolls pass thereover and pull the tassels upwardly from the stalks. The rolls 23, 24, of course, are rotated by the described drive therefor in the proper direction to pull the tassels upwardly, and their speed of rotation may be varied through the medium of the transmission line, as occasion may require.

The pulled tassels fall to the ground to be gathered as desired. The spirally wound resilient stripping 43 facilitates feeding the tassels rearwardly along the rolls 23, 24 as the tassels are being pulled so that said tassels will pass rearwardly from the rolls, and also provide for cushioning the gripping action of the rolls against the tassels so that the tassels will not be pinched off by the rolls.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a machine for detasseling corn in the field, a wheel-supported chassis, a pair of rotatable elongated tassel-pulling rolls in front of said chassis arranged side by side in engaging relation and extending endwise forwardly of the chassis to be moved by the chassis over the tassels and grip tassels therebetween, means to support said rolls on said chassis and hydraulically operated to swing said rolls vertically into different forwardly and upwardly inclined positions to enable said rolls to grip tassels as said rolls pass over the tassels, and power means for rotating said rolls from said chassis, the means first mentioned comprising a yoke pivoted on said chassis for vertical swinging movement and extending forwardly of the chassis, a pulley-supporting frame rising from the chassis, pull cables connected to said yoke and trained over said pulleys, and a hydraulically operative piston on the chassis for exerting pull on said cables.

LOUIS L. DOSTAL.